July 9, 1929.  M. BÖHME  1,720,259
DISTANT INDICATING DEVICE
Filed Oct. 5, 1928
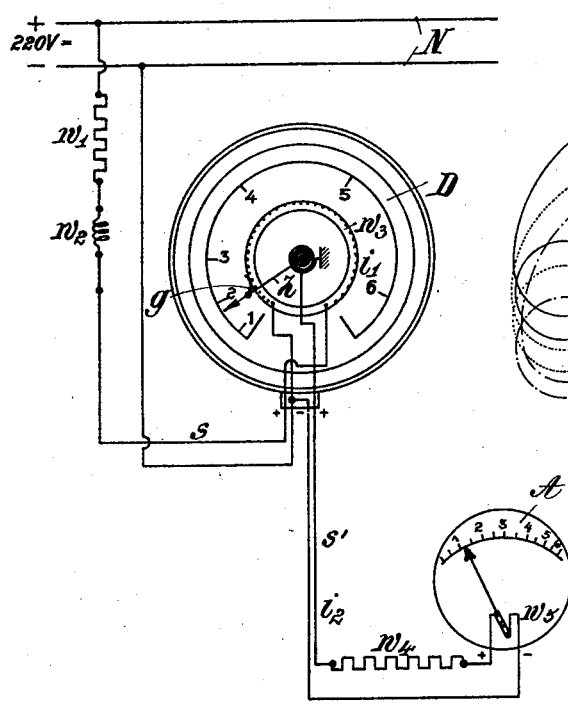
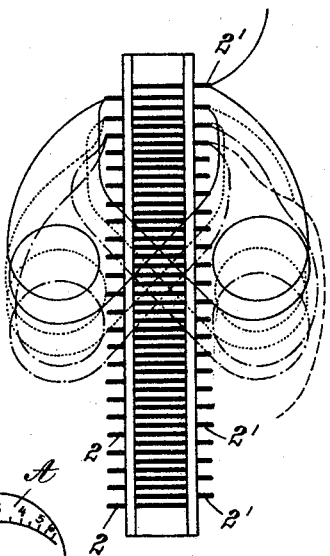
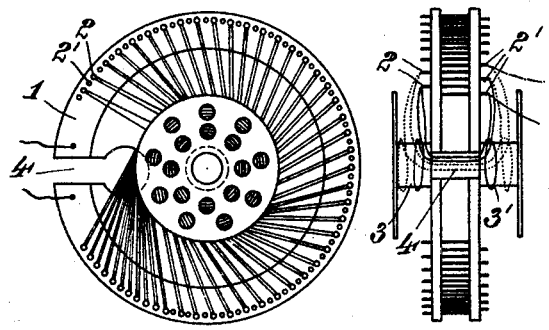
Inventor:
Martin Böhme Patented July 9, 1929.

1,720,259

UNITED STATES PATENT OFFICE.

MARTIN BÖHME, OF BERLIN, GERMANY.

DISTANT INDICATING DEVICE.

Application filed October 5, 1928, Serial No. 310,551, and in Germany July 7, 1926.

This invention relates to devices for the electrical transmission to a distance of the condition of the indicators of flow measuring devices of the type employing a constriction or throttling disc. With such flow meters the deflections of the instrument increase as the square of the quantity flowing since said quantity is proportional to the square root of the difference between the pressures in front of and behind the throttling disc. This non-uniform deflection of the indicator must be transmitted to the distant indicator in such a manner that the deflections of the latter instrument are in linear proportion to the quantity flowing.

Use is made for the transmission of the per se known arrangement wherein a sliding contact is displaced on a shunt resistance by the deflection of the primary or transmitting instrument and the voltage taken off from the said resistance or the current taken off from said resistance is measured at the distant indication point by a volt meter or ammeter the scale of which is calibrated in the values indicated by the primary instrument, namely flow quantities in the present instance.

If the indicating instrument has naturally a proportional deflection then the conversion of the quadratic scale of the primary instrument into a linear scale on the indicating instrument calls for different resistance variations in the shunt resistance for the same displacement of the sliding contact depending upon the position in which said contact is located. At the commencement of the primary or transmitter scale, where small deflections of the primary instrument correspond to large variations of the flow quantities, the resistance variations per unit of length are large. At the end of the scale, where large deflections of the primary instrument correspond to small variations only of the flow quantities, the resistance variations corresponding to the unit of length must be small.

The present invention is concerned with constructional features of the means for producing a shunt resistance in the form of a drum collector having a uniform laminæ distribution wherein the resistances between the individual laminæ are different.

According to the invention the connections between the resistance wires and the laminæ are arranged alternately on the right-hand and the left-hand sides of the collector disc. The lengths of wire are wound alternately on bobbins, which are mounted co-axially of the collector disc on the right and left-hand sides thereof and the end of each wound wire is brought out to the other side of the collector disc through a slot, the mouth of which is on the part of the collector periphery which is free from laminæ. In this manner the resistance wires are distributed approximately uniformly on the common bobbins on either side of the collector disc.

Embodiments of the invention are illustrated by way of example in the accompanying drawings in which Fig. 1 is a general diagram of the distant transmission arrangement for a flow meter, Figs. 2 and 3 are a side elevation and front elevation respectively of the shunt resistance for the transmitter and Fig. 4 illustrates the transmitter in an unrolled condition, the separate lengths of wire from laminæ to laminæ being illustrated in Figs. 3 and 4 by different kinds of lines for the sake of clearness.

Referring to Fig. 1 D is a flow meter which is of such a nature that the deflection of its indicator Z is proportional to the square of the valve of the flow to be indicated giving the well-known type of scale, cramped in the vicinity of the zero point. The indicator Z guides the sliding contact $g$ over a shunt resistance $w_3$ built into the instrument. The ends of the shunt resistance $w_3$ are connected by way of a ballast resistance $w_1$ and a regulating resistance $w_2$ to 220 volt mains N. The end of the shunt resistance corresponding to the zero position of the indicator Z and said indicator itself are connected to the transmission lines which lead over a resistance $w_4$ to a milliammeter A which is so designed that its deflection is proportional to the current strength. The regulating resistance $w_2$, which takes the well-known form of an iron resistance in a hydrogen atmosphere, is so dimensioned that in spite of the unavoidable variations in the mains and in spite of the variation of the total resistance caused by the travel of the sliding contact $g$ it maintains a practically constant current strength, a current strength of 0.2 amperes in the practical execution of the invention, in the circuit $w_1$, $w_2$, $w_3$.

The shunt resistance $w_3$ is constructed as follows: Conducting laminæ or sectors 2, 2' with the same arcuate interval or at least arranged in groups of the same arcuate interval are distributed over the end surface contacted with by the sliding contact $g$ of an insulating ring 1. The ends of the connections of the laminæ are, as is particularly clear from Figs. 3 and 4, brought out alternately to the right and left-hand sides of the ring 1. Bobbins 3, 3′ are mounted co-axially with the ring on either side thereof. In the arcuate portion of the ring 1, free from laminæ or sectors 2, 2′, a slot 4 is cut which extends almost to the bobbins 3, 3′.

The resistance wire $w_3$ is then disposed as follows (Fig. 3): The connection end is secured, for example, to the connection end of the first lamina 2′ projecting to the right. The length of wire necessary between the first and second lamina, calculated from the resistance, is wound on the right-hand bobbin 3′ (full line) except for a short portion sufficient to reach through the slot 4 to the connection end, located on the left-hand side, of the adjacent lamina 2. The requisite length of wire between the said lamina and the next lamina 2′ is wound on the left-hand bobbin 3 (full line) except for a short portion sufficient to reach through the slot 4 to the connection end of the following lamina 2′ located on the right-hand side. The requisite length to the next lamina is again wound on the right-hand bobbin 3′ (dotted line), is carried through the slot 4 to the left to the next lamina 2 and from the latter (dotted line) again over the bobbin 3 through the slot 4 to the right-hand side to the following lamina 2′. Thence the wire (chain line) is carried over the right-hand bobbin 3′ once more, through the slot 4 to the left and so forth. Since the lengths of wire vary from lamina to lamina very rapidly although constantly the lengths of wire necessary between adjacent laminæ at least are approximately equal so that the length of wire is at least approximately uniformly distributed on the two bobbins 3 and 3′ so that a constructionally favourable disposition, which also presents advantageous cooling characteristics, of the wire which in practice is of quite material length (in one example, for instance 37 metres of 0.3 millimetre nickel wire) is obtained.

The principle of the invention is naturally unaffected if, say, the lamina sub-division in the first quadrant of the slide ring is only half as large as over the remaining quadrants in order that the receiving indicator shall not move in jumps at the commencement where small deflections of the transmitting instrument must correspond to large deflections of said receiving instrument.

Obviously, furthermore, a counting or automatically recording arrangement may replace or accompany the indicator A.

I claim:

1. A resistor for distant indicating devices or the like comprising an insulating ring having a slot therein; a plurality of conducting sectors arranged in spaced relation around the periphery of the ring; a bobbin arranged co-axially on each side of the ring; and a wire wound from sector to sector around the bobbins and through the slot of the ring.

2. A resistor for distant indicating devices or the like comprising an insulating ring having a slot therein; a plurality of conducting sectors arranged in spaced relation around the periphery of the ring and projecting alternately beyond the sides thereof; a bobbin arranged co-axially on each side of the ring; and a wire wound a multitude of times from a sector of one side around the bobbin of that side, then through the slot to a sector on the other side, then around the bobbin on said other side back through the slot to the next adjacent sector of the first side and around the bobbin on the first side, and then through the slot to the next adjacent sector on the second side.

Dr. MARTIN BÖHME.